United States Patent [19]

Kutnyak et al.

[11] 4,099,744
[45] Jul. 11, 1978

[54] SNAP-IN SWIVEL END FITTING

[75] Inventors: Thomas A. Kutnyak, Greenwood; George T. Dunn, Abbeville, both of S.C.

[73] Assignee: Automation Industries, Inc., Los Angeles, Calif.

[21] Appl. No.: 761,857

[22] Filed: Jan. 24, 1977

Related U.S. Application Data

[63] Continuation of Ser. No. 592,869, Jul. 3, 1975, abandoned.

[51] Int. Cl.² ............................................. F16L 33/00
[52] U.S. Cl. ......................................... 285/7; 285/280; 285/390; 285/DIG. 4; 285/DIG. 22
[58] Field of Search ............ 285/7, DIG. 22, DIG. 4, 285/390, 280, 281, 278, 275, 272, 423

[56] References Cited

U.S. PATENT DOCUMENTS

| 747,493 | 12/1903 | Scruggs | 285/275 X |
| 1,049,542 | 1/1913 | Smith | 285/DIG. 4 X |
| 1,509,562 | 9/1924 | Macgregor | 285/280 |
| 1,729,483 | 9/1929 | Koch | 285/280 X |
| 2,452,219 | 10/1948 | Bergvall et al. | 285/317 |
| 2,507,535 | 5/1950 | Madsen | 285/DIG. 22 |
| 3,306,638 | 2/1967 | Rubin | 285/390 X |
| 3,308,998 | 3/1967 | Oppasser et al. | 285/DIG. 22 X |
| 3,461,877 | 8/1969 | Morch | 285/272 X |
| 3,695,643 | 10/1972 | Schmunk | 285/DIG. 4 X |
| 3,727,949 | 4/1973 | Kleykamp et al. | 285/7 |

FOREIGN PATENT DOCUMENTS

| 1,247,652 | 10/1960 | France | 285/DIG. 4 |
| 928,911 | 6/1963 | United Kingdom | 285/423 |

Primary Examiner—Thomas F. Callaghan
Attorney, Agent, or Firm—Thomas L. Flattery

[57] ABSTRACT

A flexible vacuum cleaner hose is provided with a simple and inexpensive end fitting for use with various vacuum cleaner accessories and attachments. The hose is a corrugated plastic, i.e., it has annular rings or corrugations formed therein. Each section of hose has a predetermined length with a suitable cuff on each end thereof. Each of the cuffs includes a snap lock. The end fitting is a one piece molded member having a locking seat and a tapered end section or a threaded end section. The tapered section is adapted to be forced into the cuff so as to spread the snap lock on the cuff. The snap lock rides over the end section and drops into the locking seat formed therebehind. This is effective to lock the end fitting on the hose while allowing it to remain free to rotate inside the cuff.

12 Claims, 5 Drawing Figures

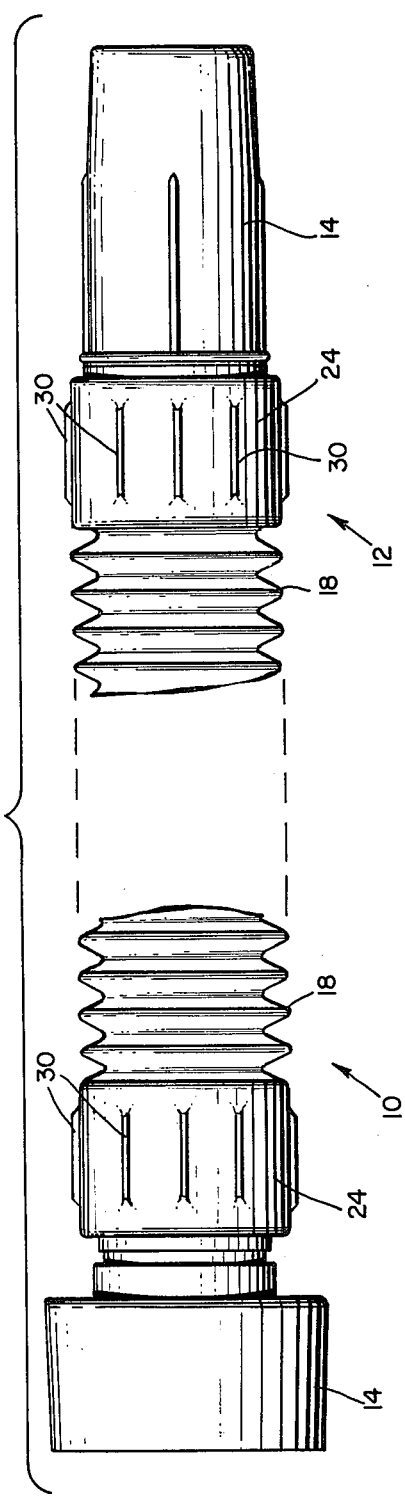
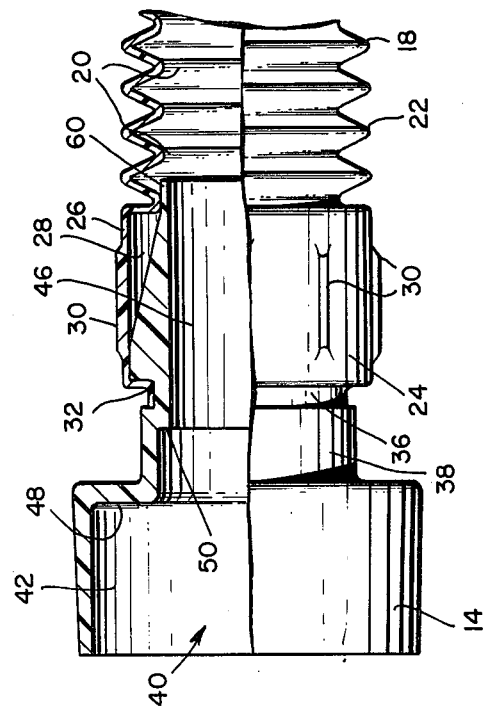
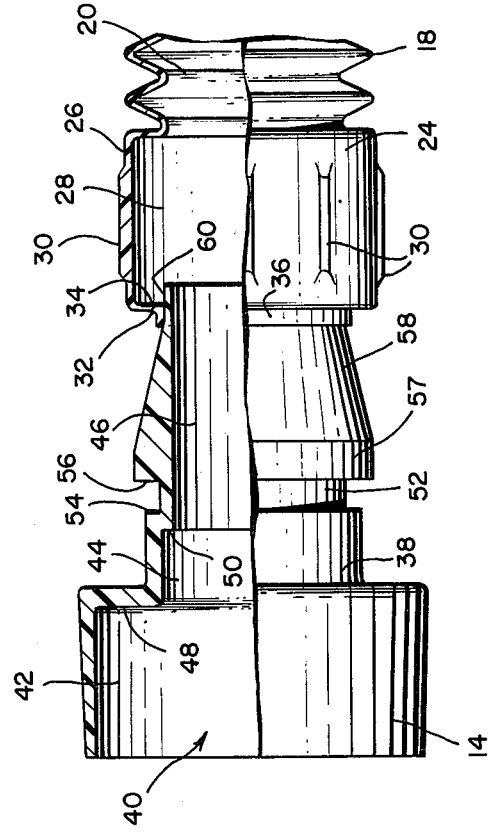

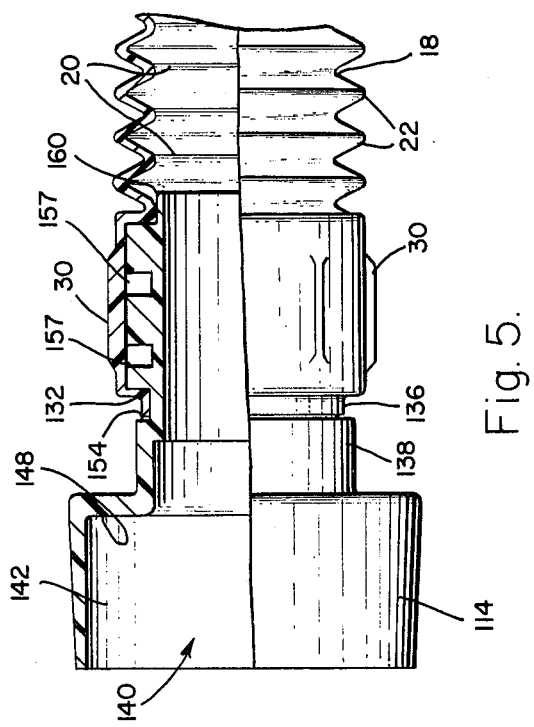
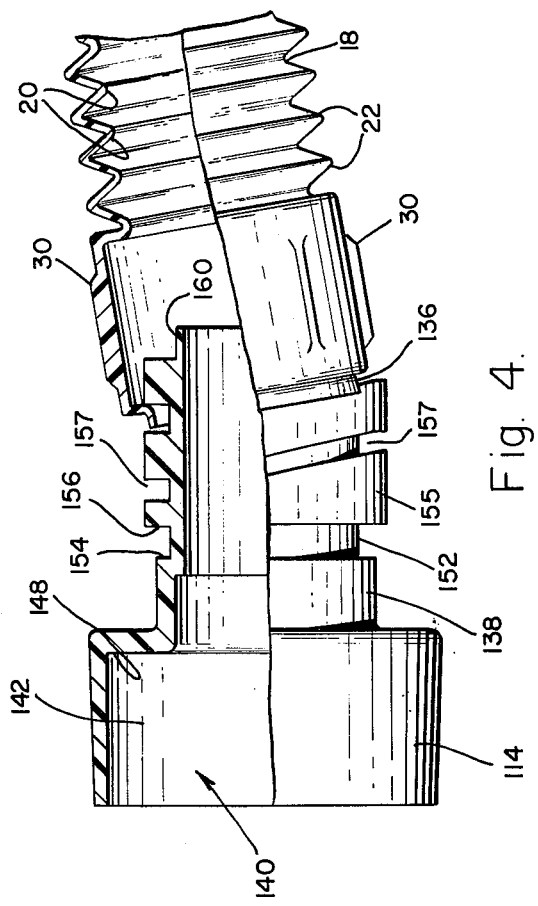

SNAP-IN SWIVEL END FITTING

This is a continuation of application Ser. No. 592,869 filed July 3, 1975 and now abandoned.

BACKGROUND

Various types of vacuum cleaners and particularly the so-called canister type of vacuum cleaner normally employs a flexible hose. One end of the hose is attached to the vacuum cleaner while the other end is attached to a suitable attachment or accessory, such as a wand, cleaning head, brush, etc. Although any type of hose may be used one type which has been widely used is in essence a corrugated plastic tube. Such as hose can be fabricated by any desired process. However, it has been found a continuous blow mold process is particularly well suited.

This form of blow molding is an economical process capable of continuously producing a high quality hose in endless lengths at reasonable prices. After the hose has been molded and allowed to cool, it is cut at preselected intervals to provide individual hose sections of fixed length.

It is desirable for each end of each section of hose to have a suitable end fitting adapted to be attached to the vacuum cleaner and/or to the various attachments and accessories.

At one time it was customary to cement or bond a suitable fitting into each end of the hose. However, this is a time consuming and very expensive operation. In addition, since the fitting was permanently bonded onto the hose section, it is permanently locked into a fixed position and could not be rotated or swiveled. This is turn frequently caused the hose to kink or become tangled during use.

More recently it has been proposed to provide an end fitting such as disclosed in U.S. Pat. No. 3,727,949, entitled "Hose Construction". This type of end fitting is forced inside of the hose and traps several of the corrugations in the hose so as to maintain them axially compressed. In order to insert this type of end fitting into the end of the hose, the hose must be pliable; i.e., it must still be hot. It is highly likely that the operator will be badly burned when manipulating the end fitting and the hot hose. Moreover, the force that is required to force the fitting into the hose is approximately equal to the force required to pull the fitting from the hose. As a consequence, the end fitting cannot be conveniently installed and/or the fitting will pull out too easily. In addition, when the hose sections are cut from the continuous hose the ends of the sections are generally somewhat ragged and irregular. With this type of fitting these ragged ends remain exposed.

SUMMARY

The present invention overcomes the foregoing difficulties. More particularly, this is accomplished by continuously molding an endless hose such that when it is cut into individual sections, each end of the sections includes a cuff on each end. This cuff is adapted to receive the end fitting and includes a snap lock which is adapted to lock onto the end fitting.

The end fitting includes a locking seat and an end section which extends from the seat to the end of the fitting. In one embodiment, the end section is tapered. This provides a ramp angle sufficiently low to ensure a spreading of the snap lock on the end of the cuff when the fitting is forced therein with a modest axial force. In another embodiment, the end section has threads which are effective to spread the snap lock on the end of the cuff as it is twisted over the end section.

In both embodiments when the end fitting has been forced into the cuff and is in the desired position, the snap lock on the cuff drops over the edge of the end section and into the locking seat. This securely locks the end fitting in position on the end of the hose section. In addition, one or more of the convolutions in the hose may ride on the surface of the section so as to be forced radially outwardly. This is effective to ensure an airtight seal.

DRAWINGS

FIG. 1 is a side view of a hose section having end fittings embodying one form of the present invention securely locked in position thereon.

FIG. 2 is a side view, with a portion thereof broken away, of the hose and end fitting in a disassembled condition.

FIG. 3 is a side view similar to FIG. 2 but showing the end fitting in a fully assembled position on the hose.

FIG. 4 is a side view, similar to FIG. 2 but showing a hose and an end fitting embodying a different form of the present invention.

FIG. 5 is a side view similar to FIG. 4 showing the second embodiment of the end fitting in the fully assembled position on the hose.

DESCRIPTION

Referring to the drawings in more detail and particularly FIG. 1, a side view of a section 10 of a vacuum cleaner hose 12 is shown. The hose 12 is shown with end fittings 14 embodying one form of the invention attached to each end. The hose 12 may be of any desired variety. However, in the present instance the hose 12 is of a plastic variety having a series of convolutions or corrugations 18. The interior 20 of the corrugations 18 defines an inside diameter of the hose 12. The exterior 22 of the corrugations 18 defines an outside diameter.

The hose 12 is normally formed from a fairly rigid plastic. However, it is sufficiently soft or resilient to allow bending. It can be seen that the corrugations 18 are effective to increase the flexibility of the hose 12 and allow it to be easily bent. At the same time they reinforce the hose 12 and ensure it retaining its circular shape.

The hose 12 may be manufactured in an endless length by any desired continuous process. By way of example, the hose 12 may be produced by a so-called "blow mold" process.

In this type of blow mold process two endless belts having a so-called "race track" configuration are arranged in a side-by-side relationship; i.e., one of the straight sides of the "race track" on one belt is positioned next to the straight side of the other belt. The two belts are synchronously driven in counter rotating fashion whereby the adjacent straight sides move together.

A plurality of mold blocks containing molded cavities are mounted on the two belts so as to be carried thereby. As the blocks travel with the belts when they are on juxtaposed straight sections of the belts, their faces will mate with each other.

The melting faces of the blocks are recessed to form a mold cavity. These cavities are of a generally cylindrical shape but have annular recesses therein. When the blocks are mated the recesses form rings whereby the finished hose will have corresponding corrugations 18 therein. These corrugations 18 are relatively close to each other and are effective to provide the hose 12 with a high degree of flexibility.

At least one mating pair of blocks on the two belts include a cavity suitable for forming a double cuff segment in the hose 12. The details of this cuff will be described in more detail subsequently. However, it should be noted that each time a length of hose 12 corresponding to the distance between the special cuff blocks is molded, there will be a double cuff segment formed on the hose 12. The spacing between the double cuff segments is selected to correspond to the desired length of the finished sections of vacuum cleaner hose.

As the two belts are synchronously driven in counter-clockwise directions, the blocks continuously mate with each other. An endless sleeve or tube or hot plastic is continuously extruded into the mold cavities formed between the blocks. This sleeve or tube is then "blown" or inflated so that it expands radially outwardly against the surfaces of the mold cavities. By the time the blocks have traversed the straight side of the "race track" and separated, the hose 12 has cooled to the point where it is self-supporting.

Following the blow molding, the endless hose 12 is allowed to cool to a temperature where it can be easily handled. At this point the hose 12 is cut into sections of the desired length. This is accomplished by chopping or cutting, etc., the middle of each of the double cuff segments. This results in the continuous hose being separated into hose sections 10 of predetermined length.

When the double cuff segments are cut in two, each half will remain on the end of its respective hose section 10 to form an end cuff 24. Normally all of these cuffs 24 will be substantially identical.

As may best be seen in FIGS. 2 and 3, each cuff 24 includes a center or barrel section 26. This barrel 26 is normally substantially cylindrical and forms an enlarged passage 28. The outside diameter of the barrel 28 is approximately equal to the outside diameters of the corrugations 18. In some circumstances it may be desirable to mold reinforcing ribs 30 on the outside of the barrel 26. These ribs 30 are circumferentially spaced and extend longitudinally of the cuff 24 and are effective to reinforce it and prevent ballooning out, collapsing inwardly and other distortions of the cuff.

The outer end of the cuff 24 includes a snap lock 32. The snap lock 32 is adapted to engage the fitting 14 and securely lock it in position on the end of the hose. However, the snap lock 32 is effective to allow the fitting 14 to turn or swivel on the hose.

Any suitable type of snap lock 32 may be utilized. However, in the present instance the snap lock 32 includes a radial flange 34. This flange 34 projects radially inwardly toward the center of the passage 28 substantially normal to the axis of the hose 12. The inside diameter of this flange 34 is normally substantially equal to the inside diameter of the corrugations 18. In addition it may be desirable for the inner edge of the flange 34 to include a short sleeve 36. This sleeve 36 projects axially outwardly from the flange 34.

The end fitting 14 is normally molded of a suitable plastic material. Although the plastic may be the same as the hose 12, it has been found desirable to utilize a fairly rigid plastic that is not easily deformed. By way of example, it has been found that a high impact polystyrene is well suited for this purpose. The end fitting 14 may be formed by any suitable process such as injection molding, etc.

The end fitting 14 includes a housing or body 38 having a passage 40. The passage 40 extends axially through the housing 38 and includes three separate portions 42, 44 and 46. The outer portion 42 of the passage 40 is adapted to mate with and be secured onto an attachment or accessory and/or to the vacuum cleaner itself. In the present instance, this portion 42 of the passage 40 is enlarged whereby the end of the fitting 14 has a bell shape.

The center or middle portion 44 of the passage 40 has a reduced diameter so that it is separated from the end portion 42 by a radial face 48. The third or inner portion 46 of the passage 40 has a still further reduced diameter whereby it is separated from the center portion 44 by a second radial face 50. The inside diameter of the inner portion 46 is approximately equal to the inside diameter of the hose 12 as defined by the inside of the corrugations 18.

The outside of the fitting 14 includes a locking seat 52. This locking seat 52 is in the form of an annular recess. The seat 52 is disposed at about the middle of the fitting 14 and extends completely around the outside of the fitting 14. The opposite sides of the recess or seat 52 are normal to the axis of the fitting to thereby form a pair of radial faces 54 and 56.

The end of the fitting 14 includes means for spreading the snap lock 32 on cuff 24 so that it can pass over the fitting and drop into the locking seat 52. In this embodiment this includes a tapered section 58. The tapered section 58 has the smallest diameter situated immediately adjacent the end of the fitting 14. The taper may extend all the way to the end of the fitting or there may be a short cylindrical skirt 60. The outside diameter of this end skirt 60 is approximately equal to or somewhat greater than the inside diameter of the corrugations 18.

The maximum diameter 57 of the tapered section 58 is positioned immediately adjacent to the locking seat 52. This maximum diameter is approximately equal to or just slightly less than the inside diameter of the cuff barrel 26.

It can be seen that the skirt 60 and the small end of the tapered section 58 can be easily inserted into the passage 40 inside of the cuff. If an axial force is then applied to the fitting 14 and the hose 12, the sleeve 36 will slide along the tapered surface 58. As this sliding progresses the snap lock 32 will expand. The ramp angle of the taper section 58 is relatively small. As a result, even a nominal axial force on the fitting 14 will produce a sufficient radial force to cause the snap lock 32 to expand outwardly.

If this sliding action continues when the fitting 14 is forced into the cuff 24 a sufficient distance, the snap lock 32 including the sleeve 36 thereon will ride over the end of the tapered section 58 and drop into the locking seat 52.

Once the snap-lock 32 has dropped behind the tapered section 58 and into the locking seat 52, the end fitting 14 is securely locked in position. The sleeve 36 is now trapped in the bottom of the locking seat 52 between the faces 48 and 50. As a result, the fitting 14 is no longer free to move into or out of the hose 12.

It can be appreciated that since the flange 34 on the snap-lock 32 and the face 56 are radial even an extremely large axial force will not produce any radial expansion of this cuff 24. As a consequence, it will take a very large force bordering on complete destruction of the hose 12 in order to pull the end fitting 14 from the hose 12.

However, it can be appreciated that the end fitting 14 is still free to swivel or turn inside of the cuff 24. Since the mating surfaces are smooth plastic there is little or no friction whereby the fitting 14 can easily turn.

The tapered section 58 or a cylindrical extension such as the skirt 60 may be sufficiently long to extend into and engage the interior of one of the corrugations 18. If this skirt 60 has an outside diameter slightly greater than the inside diameter of the corrugation 18, there will be a tight intimate sliding engagement.

This engagement is effective to provide an air-tight, leak-proof seal. Since there is a vacuum on the inside of the hose 12, the inside/outside pressure differential will force the corrugation 18 against the skirt 60 and thereby enhance the seal.

As an alternative, the embodiment shown in FIGS. 4 and 5 may be employed. The fitting 114 is very similar to fitting 14 and the similar parts have the same reference numeral but increased by one hundred. Accordingly, the fitting 114 includes an axial passage 140 having three parts 142, 144 and 146 separated by radial shoulders 148 and 150. The fitting 114 also has a locking seat 152 which is recess bounded by the radial faces 154 and 156.

The end section 155 of this fitting is substantially cylindrical over its entire length except for a skirt 160. The skirt 160 is adapted to fit against the inside of the hose and slide thereon as the fitting swivels.

The end section 155 includes a spiral thread 157. This tread 157 has a fairly large pitch and is fairly deep. As a result the snap lock 132 on the hose can fit into the thread.

By inserting the fitting into the end of the hose at an angle the snap lock 132 will engage the thread 155. Then by twisting the fitting into the hose the snap lock 132 will be fed along the end section 155 and eventually drop into the locking seat 152. When this occurs, the snap lock 132 will engage the face 156 and become lodged therebehind.

Once the snap lock 132 is in the recess 152, it will have to pass beyond and no longer mesh with the threads. As a result, it cannot be unthreaded from the fitting. Instead, the snap lock 32 will engage the radial face 156 and securely retain the fitting 114 locked to the hose. However, the fitting will still be free to rotate inside the hose.

Although only a limited number of embodiments of the present invention are disclosed herein, it will be readily apparent to persons skilled in the art numerous changes and modifications may be made without departing from the invention. Accordingly, the present embodiment is for illustrative purposes only and does not in any way limit the scope of the invention which is defined only by the claims which follow.

What is claimed is:

1. A hose comprising:
   an elongated flexible walled section terminating at one end thereof in a substantially rigid walled tubular cuff, said flexible walled section being integrally molded to said cuff, said cuff having an interior opening, said flexible walled section having an elongated interior chamber, said interior opening being contiguous with said elongated interior chamber, said cuff having a snap lock comprising an inwardly extending radial flange located at the free end of said cuff and an axially located sleeve attached to the free edge of said flange and extending outwardly therefrom;
   an end fitting adapted to be partially inserted within said interior opening of said cuff forming a substantially airtight connection therebetween, said end fitting includes a section having a tapered exterior surface and an interior cylindrical wall, said tapered section locatable within said interior opening, the leading edge of said tapered section having an outer diameter less than the inner diamger of said radial flange, the outer diameter of said tapered section increasing from said leading end to a diameter greater than the inner diameter of said radial flange, an inwardly extending annular groove formed within said end fitting at the back end of said tapered section, said annular groove defined by two axially disposed radial faces which normally prevent axial movement of the end fitting in either axial direction, said annular groove having a diameter equal to or somewhat less than the inner diameter of said radial flange, whereby upon insertion of said tapered section within said cuff the said radial flange expands and rides over the outer surface of the said tapered section until the said sleeve rests within said annular groove thereby axially locking said hose in said end fitting while allowing the said end fitting to freely rotate relative to said hose, with said sleeve located in said annular groove the said leading edge of said tapered section includes a hollow cylindrical axial extension which extends slightly past said cuff into the said hose.

2. The hose as defined in claim 1 wherein:
said flexible section comprising a series of spaced apart corrugations, the interior diameter of said corrugations being substantially equal to the inside diameter of said radial flange.

3. The hose as defined in claim 1 wherein:
with said end fitting inserted within said interior opening the major portion of said exterior surface being spaced from the wall surface of said interior opening of said cuff.

4. A hose comprising:
an elongated flexible walled section terminating at one end thereof in a substantially rigid walled tubular cuff, said flexible walled section being integrally molded to said cuff, said cuff having an interior opening, said flexible walled section having an elongated interior chamber, said interior opening being contiguous with said elongated interior chamber, said cuff having a snap lock comprising an inwardly extending radial flange located at the free end of said cuff and an axially located sleeve attached to the free edge of said flange and extending outwardly therefrom;
an end fitting adapted to be partially inserted within said interior opening of said cuff forming a substantially airtight connection therebetween, said end fitting includes a section having a threaded exterior surface and an interior cylindrical wall, the said threaded exterior surface adapted to engage the said radial flange of the said cuff and to carry the said radial flange along the threaded surface until the said sleeve of the said radial flange engages and loosely rests within an annular groove, the said annular groove formed within said end fitting at the back end of said threaded section, said annular groove is defined by two axially disposed radial faces which normally prevents movement of the said end fitting in either axial direction, said said annular groove having a diameter equal to or somewhat less than the inner diameter of the said radial flange.

5. The hose as defined in claim 4 including:
an axial extension formed upon the leading edge of said threaded section, with said sleeve located within said annular groove the said axial extension extends slightly past said cuff into the said hose.

6. The hose as defined in claim 4 wherein:
said flexible section comprising a series of spaced apart corrugations, the interior diameter of said corrugations being substantially equal to the inside diameter of said radial flange.

7. A hose comprising:
an elongated flexible walled section terminating at one end thereof in a substantially rigid walled tubular cuff, said flexible walled section being integrally molded to said cuff, said cuff having an interior opening, said flexible walled section having an elongated interior chamber, said interior opening being contiguous with said elongated interior chamber, said cuff having a snap lock comprising an inwardly extending radial flange located at the free end of said cuff and an axially located sleeve attached to the free end of said flange and extending outwardly therefrom;
an end fitting adapted to be partially inserted within said interior opening of said cuff forming a substantially airtight connection therebetween, said end fitting includes a section having a tapered exterior surface and an interior cylindrical wall, said tapered section locatable within said interior opening, the leading edge of said tapered section having an outer diameter less than the inner diameter of said radial flange, the outer diameter of said tapered section increasing from said leading end to a diameter greater than the inner diameter of said radial flange, an inwardly extending annular groove formed within said end fitting at the back end of said tapered section, said annular groove normally preventing axial movement of the end fitting in either axial direction, said annular groove having a diameter equal to or somewhat less than the inner diameter of said radial flange, whereby upon insertion of said tapered section within said cuff the said radial flange expands and rides over the outer surface of the said tapered section until the said sleeve rests within said annular groove thereby axially locking said hose in said end fitting while allowing the said end fitting to freely rotate relative to said hose.

8. The hose as defined in claim 7 wherein:
said flexible section comprising a series of spaced apart corrugations, the interior diameter of said corrugations being substantially equal to the inside diameter of said radial flange.

9. The hose as defined in claim 7 wherein:
with said sleeve located in said annular groove the said leading edge of said tapered section includes a hollow cylindrical axial extension which extends slightly past said cuff into the said hose.

10. The combination of:
a hose comprising a flexible section and a cuff at the end of the flexible section wherein said flexible section and cuff have been intricately molded to form a one-piece hose, said cuff having a cylindrical barrel section contiguous with the flexible section, and having an inwardly-directed, radial flange on the outer end of said cuff, said flange having axial edge; and,
an end fitting connected to said hose and comprising an exterior annular groove and a means for inserting the end fitting into the cuff wherein said inserting means is a tapered hollow nose whose leading end has an outer diameter less than the inner diameter of the radial flange, and wherein said diameter slowly increases in a diameter greater than said flange diameter so that upon insertion, the radial flange expands and rides over the tapered surface of the nose until the axial edge of the radial flange drops into and loosely rests upon the annular groove, thereby axially locking the hose and end fitting together, by allowing the end fittings to freely rotate relative to said hose and wherein said inserting means includes a hollow cylindrical axial extension which is adapted to extend into the hose beyond the barrel section of the cuff which is adapted to engage the flexible section of the hose to thereby form an air-tight seal, and a cylindrical section having the exterior annular groove disposed behind said inserting means, said groove defined by two axially-disposed, radial faces which block axial movement of the end fitting in either direction, said annular groove having received the axial edge of said radial flange, and said annular groove having a diameter equal to or somewhat less than the inner-diameter of the radial flange thereby providing a loose engagement and allowing the end fitting to freely rotate relative to the hose.

11. The combination of:
a hose comprising a flexible section in a cuff at the end of the flexible section, said cuff having a cylindrical barrel section contiguous with the flexible section, and having an inwardly directed radial flange on the outer end of said cuff, said flange having an axial edge; and,
an end fitting connected to said hose and comprising a means for inserting the end fitting into the cuff, and a cylindrical section having an exterior annular groove disposed behind said inserting means, said groove being defined by two axially-disposed, radial faces which block axial movement of the end fittings in either direction, said annular groove having received the axial edge of said radial flange, and said annular groove having a diameter equal to and somewhat less than the inner-diameter of the radial flange thereby providing a loose engagement and allowing the end fitting to freely rotate relative to the hose, wherein said inserting means is a hollow cylindrical section having a thread adapted to receive the radial flange of the cuff and to carry the radial flange along the hollow cylindrical section until the axial edge of the radial flange engages and loosely rests within the annular groove, thereby axially locking the hose and end fitting together, while allowing the end fitting to freely rotate relative to said hose, said inserting means including a cylindrical axial extension which is adapted to extend into the hose beyond the barrel section of the cuff and which is adapted to engage the flexible section of the hose to thereby form an air-tight seal.

12. The combination of:
a hose comprising a flexible section and a cuff at the end of the flexible section, said cuff having a cylindrical barrel section contiguous with the flexible section, and having an inwardly directed, radial flange on the outer end of said cuff, said flange having an axial edge; and, an end fitting connected to said hose and comprising an exterior annular groove and a means for inserting the end fitting into the cuff wherein said inserting means is a tapered hollow nose whose leading end has an outer diameter less than the inner diameter of the radial flange, and when said diameter slowly increases to a diameter greater than said radial flange diameter so that upon insertion, the radial flange expands and rides over the tapered surface of the nose until the axial edge of the radial flange drops into and loosely rests within the annular groove, thereby axially locking the hose and end fitting together while allowing the end fitting to freely rotate relative to said hose and wherein said inserting means includes a hollow cylindrical axial extention which is adapted to extend into the hose beyond the barrel section of the cuff and which is adapted to engage the flexible section of the hose to thereby form an air-tight seal, and a cylindrical section having the exterior annular groove disposed behind said inserting means, said groove defined by two axially-disposed, radial faces which block axial movement of the end fitting in either direction, said annular groove having received the axial edge of said radial flange, and said annular groove having a diameter equal to or somewhat less than the inner diameter of the radial flange, thereby providing a loose engagement and allowing the end fitting to rotate freely relative to the hose.

* * * * *